Nov. 12, 1968 W. J. BIEBER 3,410,615
SUPPORT BEARING FOR AXIALLY MOVABLE ELONGATED MEMBER
HAVING A VARYING DIAMETER
Filed March 31, 1967 5 Sheets-Sheet 1
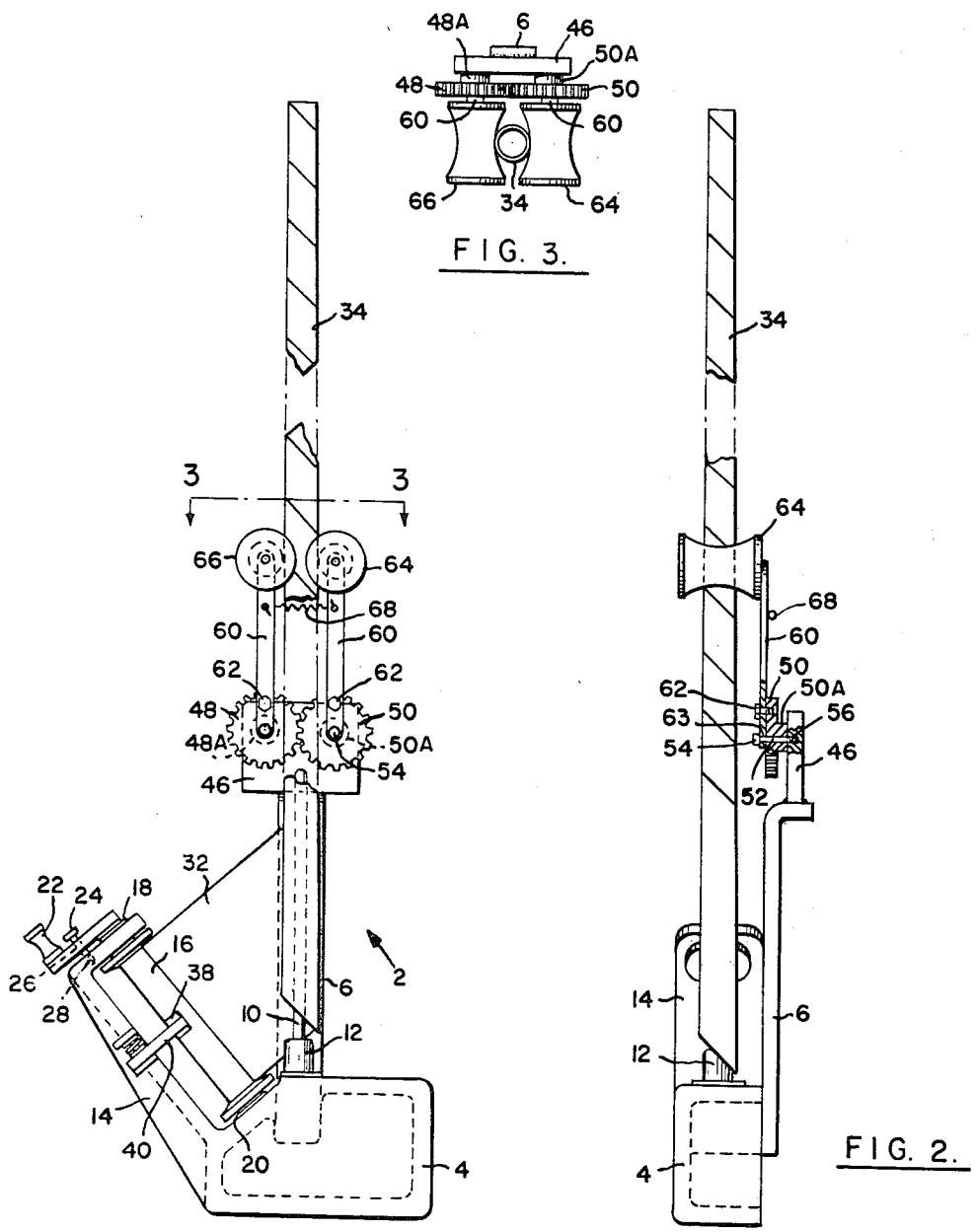
INVENTOR
WILLIAM J. BIEBER
BY
ATTORNEYS Nov. 12, 1968

W. J. BIEBER 3,410,615

SUPPORT BEARING FOR AXIALLY MOVABLE ELONGATED MEMBER
HAVING A VARYING DIAMETER

Filed March 31, 1967

INVENTOR
WILLIAM J. BIEBER
BY
Busser Smith & Harding
ATTORNEYS

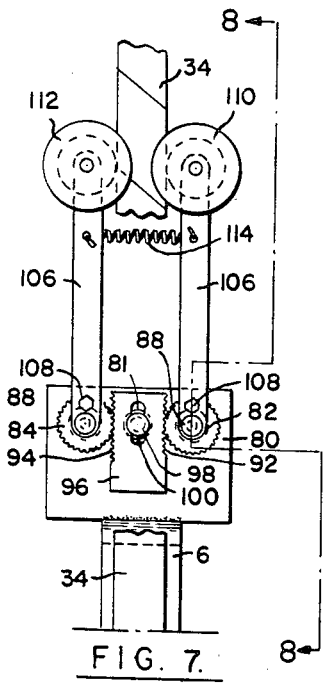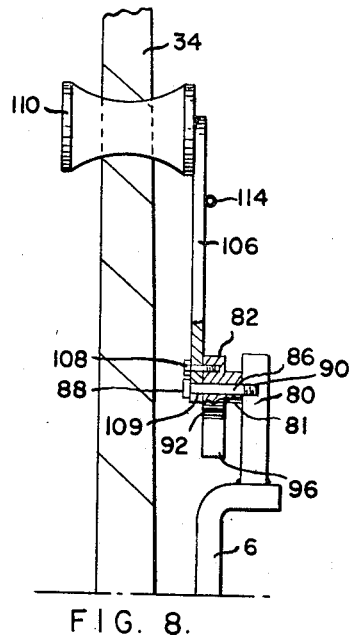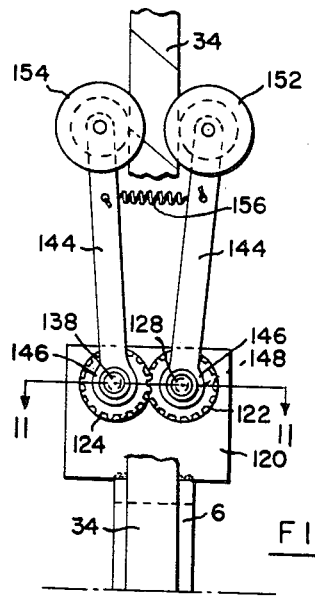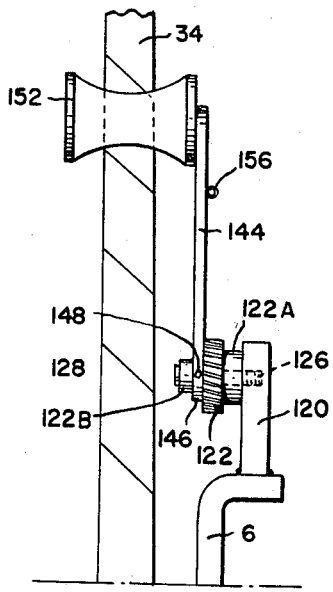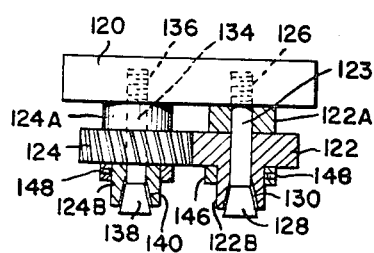

Nov. 12, 1968

W. J. BIEBER 3,410,615

SUPPORT BEARING FOR AXIALLY MOVABLE ELONGATED MEMBER
HAVING A VARYING DIAMETER

Filed March 31, 1967

INVENTOR
WILLIAM J. BIEBER

BY
Besser Smith & Hurley

ATTORNEYS

Nov. 12, 1968  W. J. BIEBER  3,410,615
SUPPORT BEARING FOR AXIALLY MOVABLE ELONGATED MEMBER
HAVING A VARYING DIAMETER
Filed March 31, 1967  5 Sheets-Sheet 5

INVENTOR
WILLIAM J. BIEBER
BY
*Busser Smith & Harding*

ATTORNEYS

United States Patent Office 3,410,615
Patented Nov. 12, 1968

3,410,615
SUPPORT BEARING FOR AXIALLY MOVABLE ELONGATED MEMBER HAVING A VARYING DIAMETER
William J. Bieber, Doylestown, Pa., assignor to Ametek, Inc., New York, N.Y., a corporation of Delaware
Filed Mar. 31, 1967, Ser. No. 627,553
11 Claims. (Cl. 308—6)

ABSTRACT OF THE DISCLOSURE

A support bearing for an axially movable member having a varying diameter including spaced rollers adapted to engage the outer periphery of the movable member. Spring means biases the rollers toward the movable member. Also the rollers are mechanically interconnected by levers and gears.

---

This invention relates to a support bearing for an axially movable elongated member having a varying diameter.

An example of an axially movable elongated member having a varying diameter is a self-erecting spiral tube. Such tubes are employed as antennas and as booms for supporting, for example, solar panels. In many instances, it is desirable and sometimes necessary to provide such devices with a support bearing providing a resistance to transaxial movement. Obviously, such a support bearing must also be capable of adjusting to variations in diameter. Such a support bearing is provided by this invention.

In addition, the movable member such as a self-erecting spiral tube may also be rotating about its own axis as it moves through the support bearing. The support bearing of this invention accommodates such rotation and provides where necessary means for minimizing resistance to such rotation.

The support bearing of the invention is provided with at least two spaced members adapted to engage the outer periphery of a movable member. The spaced members are biased towards each other. The spaced members are interconnected by means providing for a relatively low resistance to uniform movement of the spaced members away from each other and a relatively high resistance to independent movement of any one spaced member away from another member.

The invention will be clarified on reading the following description in conjunction with the drawings in which:

FIGURE 1 is a front elevation, partially broken away, of a support bearing in accordance with the invention cooperating with a self-erecting tube;

FIGURE 2 is a right side elevation of the structure of FIGURE 1, partially broken away;

FIGURE 3 is a horizontal section taken on the plane indicated by the line 3—3 in FIGURE 1 showing the support bearing;

FIGURE 7 is a front elevation, partially broken away, of an alternative embodiment of the invention;

FIGURE 8 is a vertical section, partially broken away, taken on the planes indicated by the line 8—8 in FIGURE 7;

FIGURE 9 is a front elevation, partially broken away, of an alternative embodiment in accordance with the invention;

FIGURE 10 is a right side elevation, partially broken away, of the structure of FIGURE 9;

FIGURE 11 is a horizontal section taken on the plane indicated by the line 11—11 in FIGURE 9;

Figure 5:
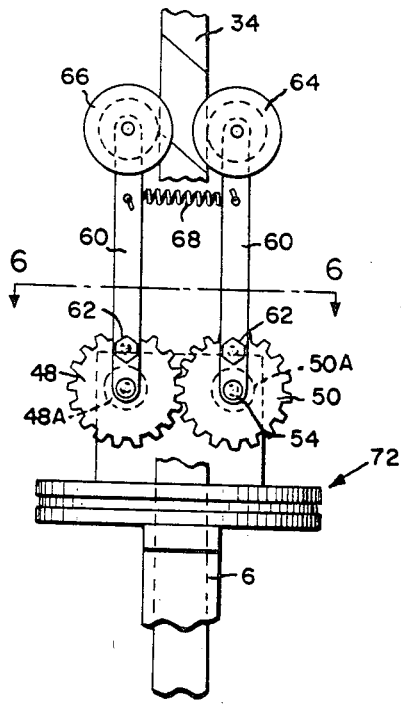
FIGURE 5 is a front elevation of the structure of FIGURE 4, partially broken away.

Referring first to FIGURES 1 and 2, a self-erecting tube device 2 in accordance with the invention has a metal base 4 on which is mounted a standard 6. A guide pin 10 secured to base 4 carries a rotatable guide member 12.

Base 4 has a U-shaped portion 14 in which a drum 16 is rotatably mounted in roller bearings indicated at 18 and 20. A crank handle 22 is connected to drum 16 for the rotation thereof. Handle 22 can be locked by means of a headed pin 24 which passes through an opening 26 in handle 22 and into an opening 28 in base 4.

A helical ribbon spring 32 having adjacent turns set to tightly coil in overlapping and telescoping engagement has one end secured to drum 16. Spring 32 is adapted to be wound on drum 16 and extends outwardly about guide pin 10 and upwardly as a tube 34 where, since the spring is unrestrained, it assumes its helical form with adjacent turns overlapping.

Drum 16 is provided with a cut-out portion 38 for the reception of spring biased stop member 40 which is of the type normally employed with non-cumulative force spring motors.

A plate 46 is welded to standard 6 to provide for the mounting of a pair of meshed gears 48 and 50. Gear 48 has a hub portion 48A and gear 50 has a hub portion 50A. A pin 52 having a head 54 passes through the center of each of gears 48 and 50 for the rotatable mounting thereof and is threadably secured to plate 46 as indicated at 56 in FIGURE 2.

A lever 60 is secured to gear 50 by a machine screw 62 and has an opening 63 through which the associated pin 52 passes. An inwardly curved roller 64 is mounted for rotation on a substantially horizontal axis on lever 60. A second identical lever 60 is similarly secured to gear 48 and has mounted thereon for rotation on a substantially horizontal axis an inwardly curved roller 66. The levers 60, 60 are biased towards each other by means of an extension coil spring 68 connected thereto.

*Operation.*—In operation, tube 34 extends upwardly between rollers 64 and 66. As the tube 34 moves upwardly, the tube diameter increases. Spring 68 will permit the ready uniform movement of rollers 64 and 66 away from each other to accommodate the increasing diameter of tube 34. As rollers 64 and 66 move outwardly together they cause gears 50 and 48 respectively to rotate in opposite directions causing a minimum of interaction between the gears. As the tube 34 is moved downwardly by the winding of spring 32 onto drum 16, the reverse action occurs.

If, in FIGURE 1, a force is exerted on tube 34 normal to its centerline and to the left or right, the tube will remain centered in the device even while the extending tube 34 is rotating about its centerline, changing in diameter, and translating along its centerline. The rollers normally grip tube 34 each with a force (F) provided by spring 68, and gears 48 and 50 are not transmitting any torque. In order to displace tube 34 to the left or right of the centerline of the device, the roller away from which the force is urging the tube tends to lose contact with the tube as the gears are caused to rotate. The roller in contact with the tube then exerts a force 2F against tube 34 because the equal and opposite forces (F) exerted by the spring ends are not acting against this roller. One spring end force (F) acts directly, and the force (F) at the opposite spring end is reflected through the gear system to this same roller. Therefore, tube 34 will remain centered until the force tending to displace it exceeds force 2F at one of the rollers. Spring 68 is chosen to provide sufficient force to stabilize tube 34 in normal operation and to prevent displacement of the tube due to side forces.

Figure 6:
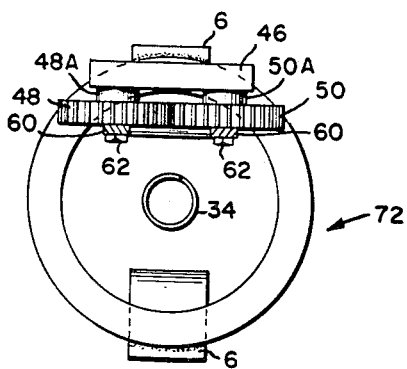
FIGURE 6 is a horizontal section taken on the plane indicated by the line 6—6 in FIGURE 5.
Figure 4:
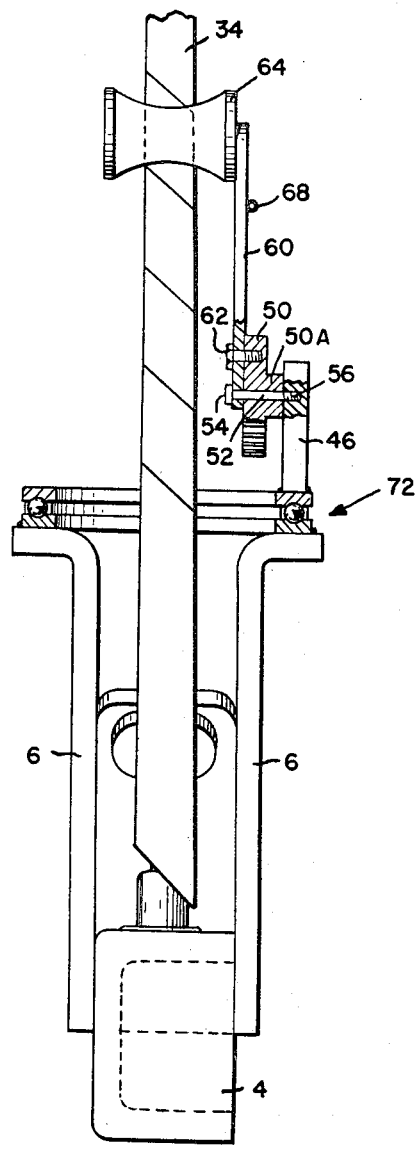
FIGURE 4 is a right side elevation, partially broken away, showing a modification of the embodiments of FIGURE 1.

Referring now to FIGURES 4 through 6 the friction on the moving tube 34 can be further reduced if desired by the employment of the embodiment of these figures wherein a pair of standards 6 are secured to the base 4 and have secured thereto a rotary bearing ring 72 to which plate 46 is secured. Otherwise the embodiment of FIGURES 4 through 6 is identical with the embodiment of FIGURES 1 through 3. The operation of this embodiment is identical with the operation of the embodiment of FIGURES 1 through 3 with the exception that rotation of the tube 34 tends to carry rollers 64 and 66 along with the tube due to their being mounted, in effect, on rotating bearing ring 72.

Referring now to FIGURES 7 and 8 a modified support bearing for tube 34 has a plate 80 mounted on bracket 6 for the rotary mounting of gears 82 and 84. Each of gears 82 and 84 is mounted for rotation on a pin 86 having a headed portion 88 and threadably secured to plate 80 as indicated at 90 in FIGURE 8. Gears 82 and 84 engage respectively teeth 92 and 94 of a rack 96 which lies spaced from plate 80 by a bushing 81 to which it is secured by means of a headed pin 98 which passes through slot 100 in rack 96 and bushing 81, pin 98 being secured to plate 80.

To each of gears 82 and 84 there is secured a lever 106 by means of a machine screw 108, the lever 106 having and opening 109 through which pin 86 passes. One lever 106 supports an inwardly curved roller 110 and the other lever 106 supports a similarly shaped roller 112. A coil extension spring 114 biases rollers 110 and 112 towards each other into engagement with tube 34.

*Operation.*—In operation, the upward movement of tube 34 with the resultant increase in its diameter opposite rollers 110 and 112 causes the rollers to be moved outwardly uniformly which in turn causes the rotation of gears 82 and 84 in opposite directions which provides for the elevation of rack 96 by the equal action of gears 82 and 84. When the tube 34 moves downwardly the opposite action takes place.

If a moment load is exerted on tube 34 tending to move only one roller outwardly, the said roller will be prevented from moving outwardly. Assuming, for example, that the roller in question is roller 110, the slight movement of this roller outwardly with a comparable outward movement of roller 112 causes gear 82 to rotate clockwise urging rack 96 upwardly and also causing the rack 96 to rotate counterclockwise about pin 98. At the same time tube 34 having moved away from roller 112 slightly, spring 114 causes roller 112 to follow tube 34 causing gear 84 to move clockwise to attempt to move rack 96 downwardly and to cause rack 96 to rotate counterclockwise about pin 98. The net result is that movement of the rack-gear system is halted preventing the rotation of gear 82 and, hence, preventing the outward movement of roller 110. It will be obvious that a similar action occurs when only roller 112 is loaded by the movement of tube 34.

Referring now to FIGURES 9 and 10, a plate 120 is secured to standard 6 for the rotatable mounting of a pair of helical gears 122 and 124. Gear 122 has a hub portion 122A and a hub portion 122B. Gear 122 is secured to plate 120 by a pin 123 which is threaded to plate 120 as indicated at 126. Pin 123 has a head 128 which is the shape of a truncated cone and is normally slightly spaced from the conical shaped opening 130 in hub portion 122B. Similarly, gear 124 has hub portions 124A and 124B and is secured to plate 120 by a pin 134 which is threadably secured to plate 120 as indicated at 136. Pin 134 has a headed portion 138 which has the shape of a truncated cone and is slightly spaced from the conical interior portions 140 of the boss portion 124B. To each of gears 122 and 124 there is secured a lever 144 having at its lower end a collar 146 and a securing set screw 148. An inwardly shaped roller 152 is secured to lever 144 and a similarly shaped roller 154 is secured to the other lever 144 as shown in FIGURE 9.

*Operation.*—In this embodiment, the movement of rollers 152 and 154 outwardly and inwardly responsive to changes in the diameter of tube 34 results in the concurrent movement of gears 122 and 124 without any loading of the gear teeth. If, however, tube 34 is loaded in moment the outward movement of the roller against which tube 34 bears will be prevented. For example, assuming that a force causes tube 34 to tend to move towards roller 154, the outward movement of the roller 154 will cause counterclockwise rotation of helical gear 124. At the same time, extension spring 156 which is connected between levers 144. 144 will exert a force on roller 152 in the direction of tube 34 causing the helical gear 122 to be loaded. The resultant loads on the teeth of helical gears 122 and 124 causes the axial movement of gear 122 away from plate 120 causing the hub portion 122B to lock against the conical head 128. Similarly, when tube 34 is loaded in moment so as to tend to move roller 152, axial movement of gear 124 will result in the locking of hub portion 124B against the conical head 138.

Figure 12:
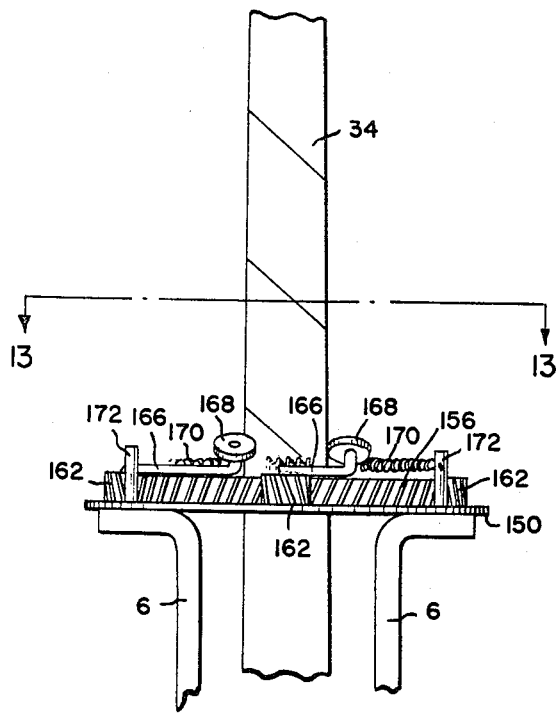
FIGURE 12 is a front elevation, partially broken away, of an alternative embodiment of the invention.
Figure 14:
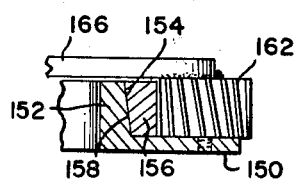
FIGURE 14 is an enlarged view of a portion of the gear ring of the structure of FIGURE 12.
Figure 13:
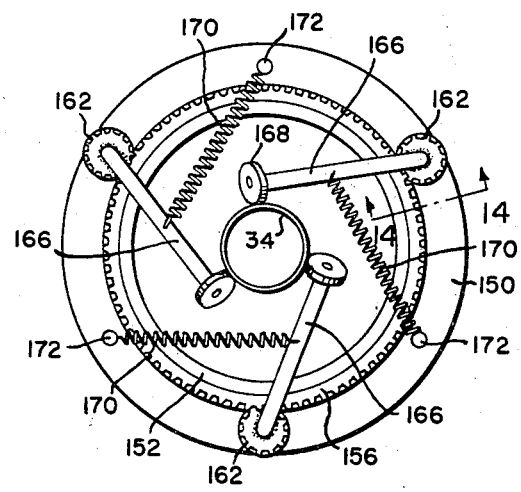
FIGURE 13 is a horizontal section taken on the plane indicated by the line 13—13 in FIGURE 12.

Referring now to FIGURES 12 and 14 a pair of standards 6, 6 mounted on base 4 (not shown), as in the case of the embodiment of FIGURE 4, has secured thereto a ring 150 having an upstanding inner flange 152 provided with an inclined outer wall 154. A helical gear ring 156 having an inclined inner wall 158 which abuts the inclined wall 154 of flange 152 rests freely on ring 150.

Three helical gears 162 mesh with ring gear 156 and are each mounted for rotation about its axis on ring 150. An arm 166 is fixedly secured to each gear 162 and carries a canted roller 168 at its outer end. An extension coil spring 10 is connected to each arm 166 and to a post 172 on ring 150 to bias each roller 168 against tube 34. The angle of rollers 168 is selected to promote the free rotation of tube 34.

*Operation.*—In operation, as the diameter of the portion of tube 34 in contact with rollers 168 changes the rollers move either inwardly or outwardly uniformly and all coact with ring gear 156 to move it clockwise or counterclockwise without forcing gear 156 against ring 150. However, if a moment load is placed on tube 34 causing the tube to move outwardly against only one roller 168, the movement of the roller 168 and its associated arm 166 tends to cause the rotation of ring gear 156 in a counterclockwise direction. The spring 170 associated with the other arms 166 will, due to the tendency of tube 34 to move away from their associated rollers 168, urge the associated gears 162 to rotate in a counterclockwise direction thus loading the associated gears 162 and producing tooth loads between their teeth and the teeth of ring 156. This results in an axial thrust causing ring gear 156 to lock against ring 150. The same result occurs if the tube 34 moves only two rollers 168 outwardly.

The embodiments of FIGURES 7 through 14 are most advantageously employed where relatively high moment loads on the axially movable member are encountered and where these loads are applied from several different directions with considerable frequency to facilitate unlocking.

Figure 15:
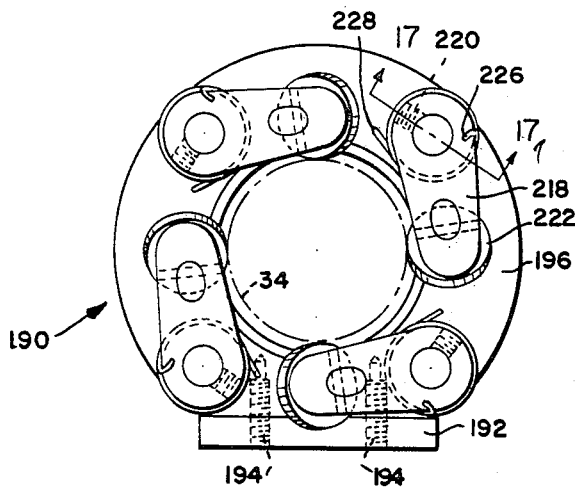
FIGURE 15 is a top plan view of an alternative embodiment of the invention.
Figure 17:
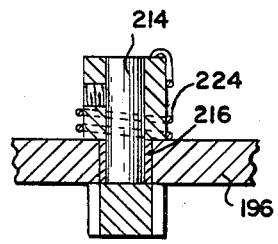
FIGURE 17 is a vertical section, partially broken away, taken on the plane indicated by the line 17—17 in FIGURE 15.
Figure 19:
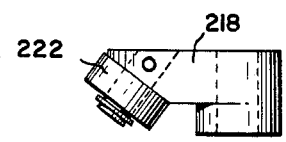
FIGURE 19 is a side elevation of one of the arms of the embodiment of FIGURE 15.
Figure 16:
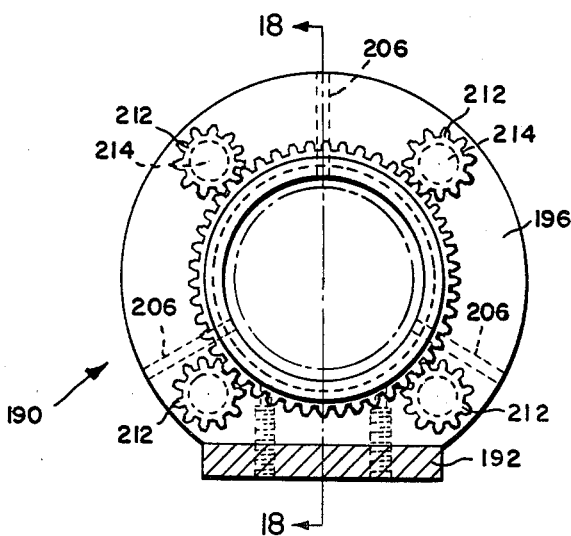
FIGURE 16 is a bottom plan view, partially broken away, of the embodiment of FIGURE 15.
Figure 18:
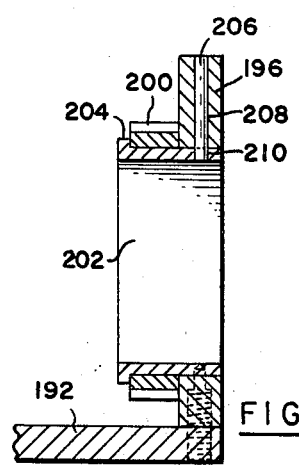
FIGURE 18 is a vertical section, partially broken away, taken on the plane indicated by the line 18—18 in FIGURE 16.

Referring now to FIGURES 15 and 16 support bearing 190 is illustrative of another embodiment of the invention. As seen in FIGURE 16, a supporting bracket 192 which is adapted to be secured to base 4 of self-erecting tube device 2 (not shown) has secured thereto by means of screw 194 a support ring 196. A ring gear 202 is mounted immediately below support ring 196 by means of a bearing member 202 provided with a flange 204 at its lower end which engages ring gear 200. A plurality of pins 206 each pass through an opening 208 in support ring 196 and an opening 210 in bearing member 202 to secure bearing member 202 to support ring 196.

Four spur gears 212 in mesh with ring gear 200 are each fixedly secured to a shaft 214 which passes upwardly through a bearing 216 mounted in support ring 196. Above support ring 196 shaft 214 has fixedly secured thereto an arm 218 by means of a set screw 220. Each arm 218 has a roller 222 mounted at an angle at its outer end. A torsion spring 224 is connected at its upper end as indicated at 226 to each arm 218 and connected at its lower end to support ring 196 as indicated at 228. Each torsion spring 224 urges the associated arm 218 so as to bring the associated roller 222 into contact with a self-erecting tube shown in phantom at 34.

*Operation.*—In operation, as the diameter of tube 34 expands and contracts the arms 218 are moved uniformly counterclockwise and clockwise respectively causing the clockwise and counterclockwise rotation of ring gear 200 respectively. However, if a moment load is applied to tube 34 so as to cause just one arm 218 to be rotated counterclockwise, the associated gear 212 will tend to cause ring gear 200 to rotate clockwise and in turn rotate all of the other gears 212 and their associated arms 218 counterclockwise. The result is that the load exerted by the tube 34 against the one arm 218 is opposed by the sum of the forces exerted by all four of the torsion springs 224. Thus, in effect, the transaxial movement of tube 34 in one direction directly towards just one roller 222 is opposed by four times the force available to resist the increase in tube diameter. Obviously, a similar result is achieved when the movement of the tube in one direction acts to move the tube against two of the rollers 222.

Generally speaking, it is satisfactory to select the springs 224 so that the maximum total force opposing a moment load imposed on tube 34 is slightly less than the force which would result in a roller 222 permanently deforming the tube 34. It has been found that when the springs are so selected the support bearing does not unduly restrict the expansion of the diameter of the tube 34 and yet resists substantial lateral movement of tube 34 under the moment load anticipated.

The embodiments of FIGURES 1 through 11 are advantageously employed where it is anticipated that moment loads on the axially movable member may be exerted generally in only one plane rather than randomly from various directions. Where moment loads are exerted on the movable member from a variety of directions at random, the embodiments of FIGURES 12 through 18 also operate very satisfactorily.

What is claimed is:

1. A support bearing for an axially movable member having a varying diameter comprising:

at least two spaced members adapted to engage the outer periphery of the movable member, means biasing said members towards the movable member, means interconnecting said members providing for substantially greater resistance to the outward movement of less than all of the members than to the simultaneous outward movement of all of the members.

2. A support bearing in accordance with claim 1 in which the spaced members are rollers mounted for rotation on a substantially horizontal axis.

3. A support bearing in accordance with claim 1 having means mounting the support bearing for free rotation about the axis of the movable member.

4. A support bearing in accordance with claim 1 having a pair of spaced members, and the interconnecting means comprising a lever supporting each spaced member, and a gear secured to each lever for rotation thereby, said gears being in mesh.

5. A support bearing in accordance with claim 1 having means securing each spaced member on a gear to provide for rotation of the gear on outward movement of the associated member, said gears being in a gear train.

6. A support bearing in accordance with claim 5 in which the gears are helical and at least one gear is free to move axially to engage friction means.

7. A support bearing in accordance with claim 4 in which the gears are helical gears and each gear is associated with friction means to arrest the rotation of the gears on axial movement of a gear into frictional engagement with its associated friction means.

8. A support bearing in accordance with claim 5 in which the gear train includes a rack having teeth on the side in engagement with one of the supporting gears and teeth on the other side in engagement with the other of said supporting gears, said rack having a substantially vertical extending slot, and a fixed pin passing through said slot.

9. A support bearing in accordance with claim 5 in which the gears are helical gears, and the gear train includes a helical ring gear in mesh with the said gears, said ring gear being associated with friction means to arrest the rotation movement of the gear train on axial movement of the ring gear towards the associated friction means.

10. A support bearing in accordance with claim 5 in which the gear train includes a ring gear in mesh with each of said gears.

11. A support bearing in accordance with claim 5 in which the spaced members are rollers and having an arm secured to each roller, each arm connected to one of said gears, a ring gear in mesh with each of said gears.

References Cited

UNITED STATES PATENTS

| 2,253,820 | 8/1941 | Spiro | 308—6 X |
| 2,265,086 | 12/1941 | Spiro | 308—6 X |
| 3,380,204 | 4/1968 | Fry et al. | 52—108 |

FOREIGN PATENTS

| 577,304 | 5/1946 | Great Britain. |

CARROLL B. DORITY, JR., *Primary Examiner.*